(12) United States Patent
Papadopoulos

(10) Patent No.: US 12,136,989 B2
(45) Date of Patent: Nov. 5, 2024

(54) METHOD AND APPARATUS FOR USER LOCALIZATION AND TRACKING USING RADIO SIGNALS REFLECTED BY RECONFIGURABLE SMART SURFACES

(71) Applicant: NTT DOCOMO, INC., Tokyo (JP)

(72) Inventor: Haralabos Papadopoulos, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 411 days.

(21) Appl. No.: 17/590,602

(22) Filed: Feb. 1, 2022

(65) Prior Publication Data

US 2022/0247480 A1 Aug. 4, 2022

Related U.S. Application Data

(60) Provisional application No. 63/144,385, filed on Feb. 1, 2021.

(51) Int. Cl.
*H04B 7/155* (2006.01)
*H04B 7/0413* (2017.01)
*H04B 7/06* (2006.01)

(52) U.S. Cl.
CPC ....... *H04B 7/15507* (2013.01); *H04B 7/0413* (2013.01); *H04B 7/0626* (2013.01); *H04B 7/15535* (2013.01)

(58) Field of Classification Search
CPC .............. H04B 7/04013; H04B 7/0413; H04B 7/0617; H04B 7/0626; H04B 7/15507; H04B 7/15535; G01S 5/0205; G01S 5/02521; G01S 5/0273
See application file for complete search history.

(56) References Cited

U.S. PATENT DOCUMENTS

| | | | |
|---|---|---|---|
| 2021/0302561 A1* | 9/2021 | Bayesteh | G01S 5/0273 |
| 2021/0344384 A1* | 11/2021 | Dunna | H01Q 3/32 |
| 2022/0059943 A1* | 2/2022 | Saab | H04B 7/0617 |
| 2023/0275644 A1* | 8/2023 | Yao | H04B 7/06958 |
| | | | 375/262 |
| 2023/0408677 A1* | 12/2023 | Duan | G01S 13/878 |
| 2024/0014860 A1* | 1/2024 | Wang | H04B 7/026 |

* cited by examiner

*Primary Examiner* — Nguyen T Vo
(74) *Attorney, Agent, or Firm* — Osha Bergman Watanabe & Burton LLP

(57) ABSTRACT

A method is disclosed for estimating one or more user terminal locations over a target coverage area by wireless signals transmitted by one or more access points and reflected by one or more reconfigurable intelligent surface panels. The method includes transmission of one or more pilot signals by each of the one or more access points, reflecting, by at least one of the one or more reconfigurable intelligent surface panels, the one or more pilot signals according to one or more predetermined reflection patterns, receiving the reflections by the user terminal, extracting one or more features from the reflections, and estimating of a user terminal location by a method based on a database comprising pairs of locations and the one or more features.

16 Claims, 18 Drawing Sheets

Reconfigurable Reflect-Array @ 60GHz ($\lambda = 5$mm)

14x16 RA units
Large spacing
between RA units!

(a) The switch loaded on the patch (b) The switches soldered on the panel.

Type 1: 5.1 mm x 4.65 mm
Type 2: 5.1mm x 4.96 mm
Each RA type has its own reflection-phase properties

Continuous RIS Design @ 5 GHz ($\lambda = 60$mm)

$d_x = \frac{d_y}{2} = 9.12$ mm $\approx 0.15 \lambda$
$t = 1.016$ mm, $w = 8.12$ mm, $g = 1$ mm Super cell of 8 unit-cells ($\approx 1.2\lambda$)

Behaves like a 3-port network

METHOD AND APPARATUS FOR USER LOCALIZATION AND TRACKING USING RADIO SIGNALS REFLECTED BY RECONFIGURABLE SMART SURFACES

TECHNICAL FIELD

One or more embodiments disclosed herein relate to mechanism(s) for providing fast and accurate positioning in a variety of environments.

BACKGROUND

In 5G new radio (NR) technologies, new requirements are being identified for location-based services.

Currently there exist methods that perform well but only in specific scenarios and applications. However, there are still use cases whose localization requirements cannot be supported by current state-of-the-art techniques.

For example, with the Global Positioning System (GPS) a user terminal determines its range to four or more GEO satellites based on time-of-arrival measurements. Knowing the location of the satellites allows the terminal to estimate its location based on its range estimates to these satellites. Some advantages to GPS include that it works well in most outdoor settings and a variety of use cases. Further, it can be enhanced by a cellular network (or other beacons with known location) to offer more accurate localization. These performance improvements can be significant especially in dense urban environments. However, GPS does also have some disadvantages in that it does not work indoors, it requires line-of-site between satellites and the user terminal, and it often works poorly in urban environments with high-rise buildings, for example, when only 3 or fewer satellites are in line-of-site with respect to the user terminal (e.g., due to blockage from high-rise buildings).

As another example, fingerprinting methods leverage Wi-Fi or cellular transmission to estimate position. In this method, the access point transmits a pilot (i.e., beacon) signal and the user terminal extracts a fingerprint or in other words specific features from the channel profile. The user terminal then uses those features to estimate the user's location. Ideally these fingerprint features should be such that: 1) they do not change over time at a given location and 2) different locations have different fingerprints. A potential advantage includes that fingerprinting can provide cm-level accuracy in static indoor environments. However, one or more disadvantages may include that fingerprinting is labor intensive, it requires building a fingerprint database for every room that the method is to be used, and such a database is built by labor-intensive field measurements. Further, fingerprinting does not work well outdoors because there is not enough scattering for differentiable fingerprints and the environment constantly changes. Moreover, fingerprinting does not work well in high-traffic indoor environments like malls for similar reasons in that the environment constantly changes.

SUMMARY

One or more embodiments of the invention provide, a method for estimating a location of at least one user terminal over a target coverage area by wireless signals transmitted by one or more access points and reflected by one or more reconfigurable intelligent surface panels, the method including transmission of one or more pilot signals by each of the one or more access points; reflecting, by at least one of the one or more reconfigurable intelligent surface panels, the one or more pilot signals according to one or more predetermined reflection patterns; receiving the reflections by the user terminal; extracting one or more features from the reflections; and estimating a user terminal location by a method based on a database comprising pairs of locations and the one or more features.

In one aspect of the method, at least one of the one or more reconfigurable intelligent surface panels are virtually partitioned into contiguous tiles, each tile reflecting an impinging pilot signal in a tile-dependent direction.

In one aspect of the method, a reflection focal point of each tile is chosen pseudo-randomly over the target coverage area.

In one aspect of the method, the reflection pattern across all tiles is pseudo-randomly changed over time.

In one aspect of the method, at least one of a number and a size of the virtually partitioned tiles is changed over time.

In one aspect of the method, pilots are transmitted on different spatial beams from at least one access point of the one or more access points and directed to different parts of the one or more reconfigurable intelligent surface panels.

In one aspect of the method, the pilot signals have been artificially delayed with respect to one another at the one or more access points prior to their transmission.

In one aspect of the method, the pilot signals transmitted by non-collocated access points have been delayed with respect to one another prior to their transmission.

In one aspect of the method, the reflection pattern across a group of tiles is restricted to a given coverage area, and a focal point of each tile in the group is otherwise chosen pseudo-randomly over that area.

One or more embodiments of the invention provide a method for estimating a location of at least one user terminal over a target coverage area by wireless signals transmitted by one or more user terminals and reflected by one or more reconfigurable intelligent surface panels, the method including transmission of one or more pilot signals by the user terminal; reflecting, by at least one of the one or more reconfigurable intelligent surface panels, the one or more pilot signals according to one or more predetermined reflection patterns; receiving the reflections by at least one of the one or more access points; extracting one or more features from the reflections; and estimating of the one or more access points location by a method based on a database comprising pairs of locations and the one or more features.

In one aspect of the method, at least one of the one or more reconfigurable intelligent surface panels is virtually partitioned into contiguous tiles, each tile reflecting an impinging pilot signal in a tile-dependent direction.

In one aspect of the method, a reflection focal point of each tile is chosen pseudo-randomly over the target coverage area.

In one aspect of the method, the reflection pattern across all tiles is pseudo-randomly changed over time.

In one aspect of the method, the reflection pattern across a group of tiles is restricted to a given coverage area, and a focal point of each tile in the group is otherwise chosen pseudo-randomly over that area.

One or more embodiments of the invention provide a system for estimating a location of a user terminal over a target coverage area by wireless signals transmitted by an access point and reflected by a reconfigurable surface panel, the system including an access point to transmit pilot signals; at least one reconfigurable surface panel that reflects the transmitted pilot signals flexibly across the coverage area, wherein the at least one reconfigurable surface panels is placed so as to have an unobstructed view to a base station and the coverage area; and a user terminal that receives reflections from the reconfigurable surface panel and estimates a location of the user terminal by a method based on a database comprising pairs of locations and one or more features.

In one aspect of the system, at least one reconfigurable surface panel is placed sufficiently high with respect to the coverage area to have unobstructed view regardless of traffic Other embodiments and advantages of the present invention will be recognized from the description and figures.

DETAILED DESCRIPTION

Figure 1:
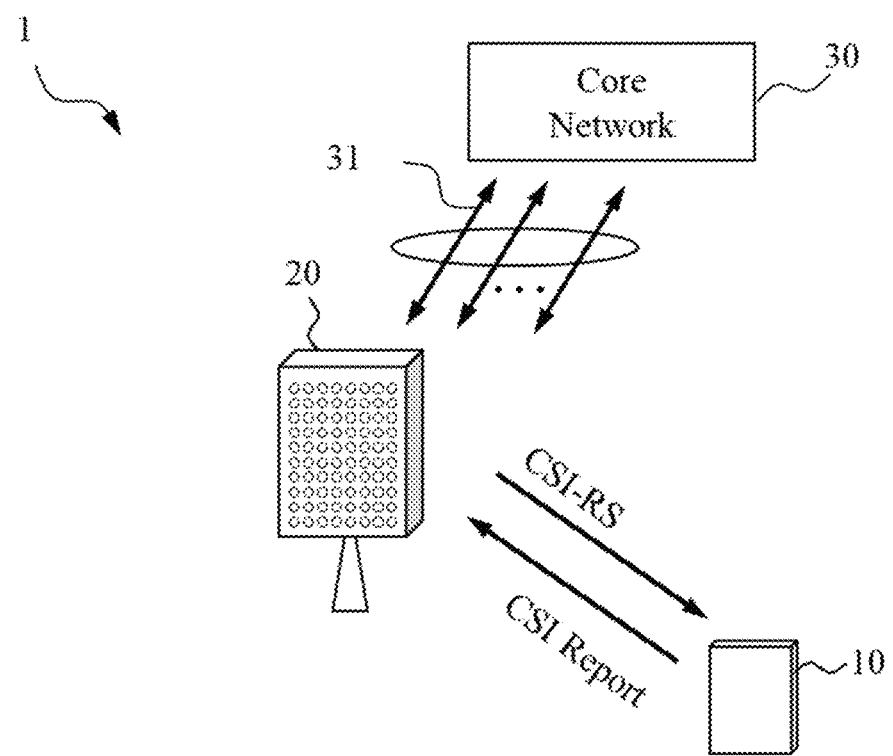
FIG. 1 is a diagram showing a schematic configuration of a wireless communications system according to embodiments.

Embodiments of the present invention will be described in detail below with reference to the drawings. Like elements in the various figures are denoted by like reference numerals for consistency.

In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

FIG. 1 describes a wireless communications system 1 according to one or more embodiments of the present invention. The wireless communication system 1 includes a user equipment (UE) 10, a base station (BS) 20, and a core network 30. The wireless communication system 1 may be a NR system. The wireless communication system 1 is not limited to the specific configurations described herein and may be any type of wireless communication system such as an LTE/LTE-Advanced (LTE-A) system.

The BS 20 may communicate uplink (UL) and downlink (DL) signals with the UE 10 in a cell of the BS 20. The DL and UL signals may include control information and user data. The BS 20 may communicate DL and UL signals with the core network 30 through backhaul links 31. The BS 20 may be gNodeB (gNB). The BS 20 may be referred to as a network (NW) 20.

The BS 20 includes antennas, a communication interface to communicate with an adjacent BS 20 (for example, X2 interface), a communication interface to communicate with the core network 30 (for example, S1 interface), and a CPU (Central Processing Unit) such as a processor or a circuit to process transmitted and received signals with the UE 10. Operations of the BS 20 may be implemented by the processor processing or executing data and programs stored in a memory. However, the BS 20 is not limited to the hardware configuration set forth above and may be realized by other appropriate hardware configurations as understood by those of ordinary skill in the art. Numerous BSs 20 may be disposed so as to cover a broader service area of the wireless communication system 1.

The UE 10 may communicate DL and UL signals that include control information and user data with the BS 20 using Multi Input Multi Output (MIMO) technology. The UE 10 may be a mobile station, a smartphone, a cellular phone, a tablet, a mobile router, or information processing apparatus having a radio communication function such as a wearable device. The wireless communication system 1 may include one or more UEs 10.

The UE 10 includes a CPU such as a processor, a RAM (Random Access Memory), a flash memory, and a radio communication device to transmit/receive radio signals to/from the BS 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

As shown in FIG. 1, the BS 20 may transmit a CSI-Reference Signal (CSI-RS) to the UE 10. In response, the UE 10 may transmit a CSI report to the BS 20. Similarly, the UE 10 may transmit SRS to the BS 20.

Configuration of BS

Figure 2:
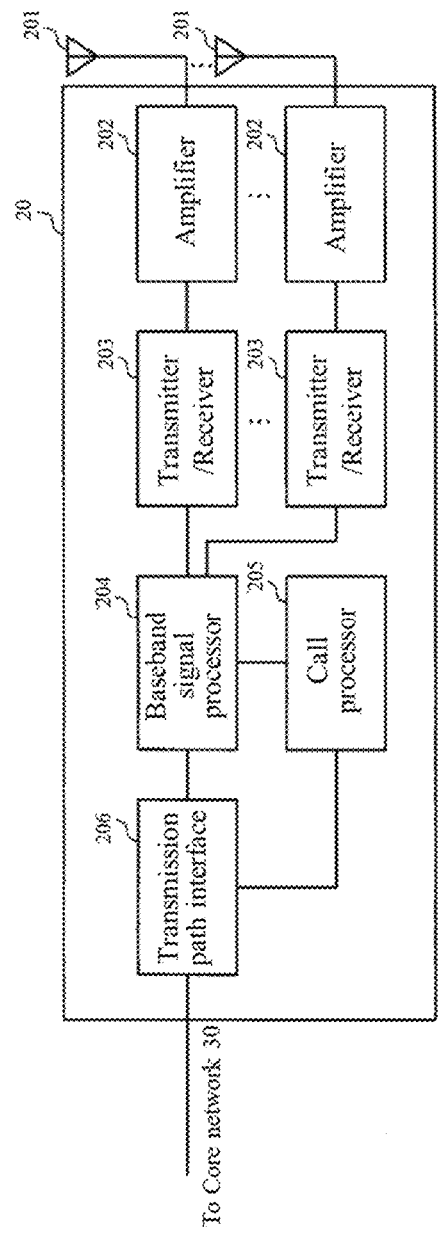
FIG. 2 is a diagram showing a schematic configuration of a UE according to embodiments.

The BS 20 according to embodiments of the present invention will be described below with reference to FIG. 2. FIG. 2 is a diagram illustrating a schematic configuration of the BS 20 according to embodiments of the present invention. The BS 20 may include a plurality of antennas (antenna element group) 201, amplifier 202, transceiver (transmitter/receiver) 203, a baseband signal processor 204, a call processor 205 and a transmission path interface 206.

User data that is transmitted on the DL from the BS 20 to the UE 20 is input from the core network, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and precoding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., Radio Resource Control (RRC) signaling and broadcast channel). Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the BS 20, radio frequency signals are received in each antennas 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network through the transmission path interface 206. The call processor 205 performs call processing such as setting up and releasing a communication channel, manages the state of the BS 20, and manages the radio resources.

Configuration of UE

Figure 3:
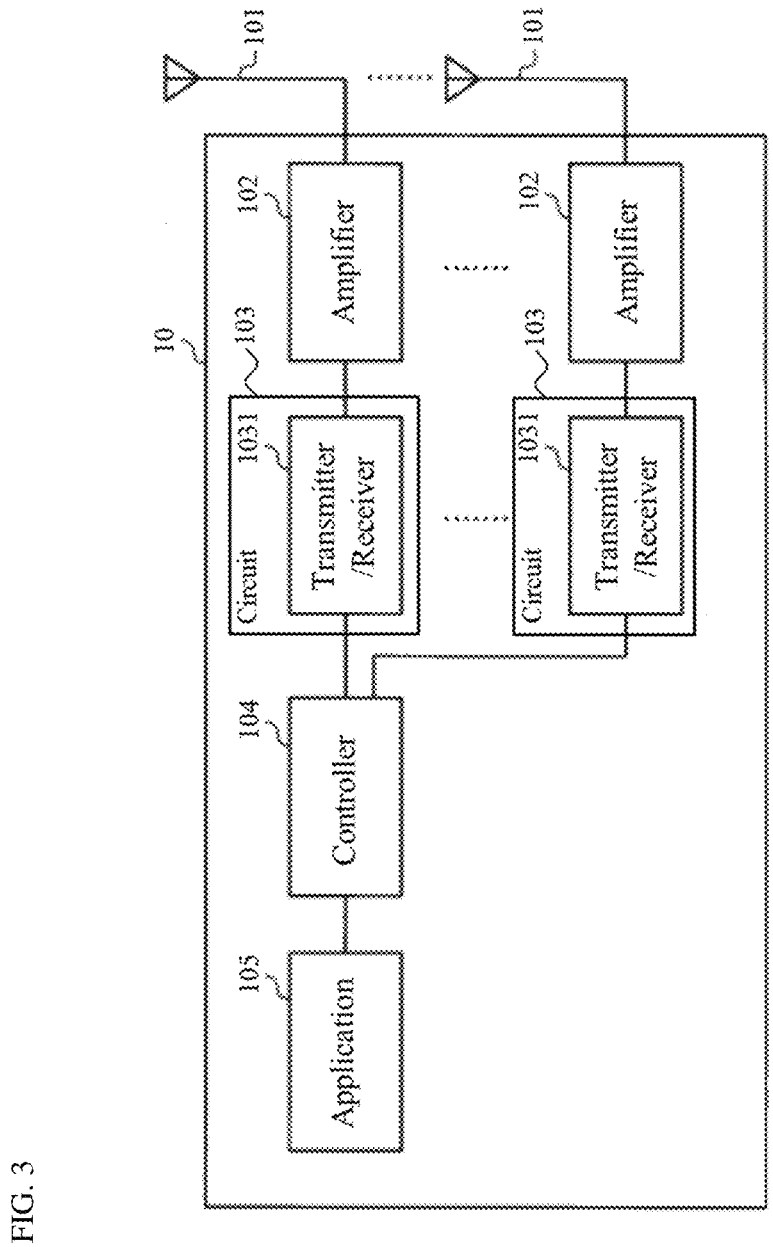
FIG. 3 is a schematic configuration of the UE 10 according to embodiments.

The UE 10 according to embodiments of the present invention will be described below with reference to FIG. 3. FIG. 3 is a schematic configuration of the UE 10 according to embodiments of the present invention. The UE 10 has a plurality of UE antenna S101, amplifiers 102, the circuit 103 comprising transceiver (transmitter/receiver) 1031, the controller 104, and an application 105.

As for DL, radio frequency signals received in the UE antenna S101 are amplified in the respective amplifiers 102, and subjected to frequency conversion into baseband signals in the transceiver 1031. These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

One or more embodiments of the invention allow a wireless network (consumer or enterprise) provider to provide fast and accurate positioning and tracking over a coverage area by exploiting wireless transmission over a cellular and/or Wi-Fi band(s). Embodiments of the invention leverage the use of controlled reflections from one or more reconfigurable intelligent surface (RIS) panels. The operator of RIS has the ability to dynamically change the RIS reflection patterns by means of a controller. RIS may also be referred to as smart surfaces or meta-surfaces.

One or more embodiments of the invention provide a method for positioning and tracking users in dense urban outdoor environments using a wireless network (e.g., cellular, Wi-Fi, etc.). Embodiments employ the use of reconfigurable smart reflecting surfaces.

Embodiments of the invention leverage the combination of downlink signaling from a base station (or access point) to one or more meta-surfaces; time-varying reflection patterns induced by said meta-surfaces; reception of the reflections by one or more UEs; and/or a positioning algorithm applied at said UEs based on features of the received reflections.

One or more embodiments of the invention may also leverage simultaneous transmission from multiple access points to one or more meta-surfaces.

One or more embodiments of the invention may also be applied in the reverse direction, i.e., in the case that the signal is transmitted by a UE to the base station via reflections from one or more meta-surfaces. In that case the base station performs a positioning algorithm to estimate the location of the said UE based on features of the received reflections. Embodiments of the invention may also leverage localization at the network by jointly processing the received signals from multiple access points or base stations.

The positioning algorithm relies on knowledge of the features of the received reflections across the coverage area. These features can be analytically obtained a priori based on the physics of propagation. Additionally, the features may be made available to the parties (i.e., UEs or base stations) that perform the positioning algorithm either in the form of a database, or in the form of parameters of a tool that has been trained to predict user location based on this database.

Advantageously, embodiments of the invention are attractive in outdoor settings with high-rise buildings where GPS exhibits poor localization performance. Embodiments may also be used in indoor settings (e.g., malls, stadiums, amphitheaters, etc.) and can provide the same positioning benefits as in dense outdoor environments. In all these cases, placing the RIS panels high up (e.g., on high-rise buildings) so that there are no obstructions between the panels and their coverage area guarantees that the scheme is fast, accurate, and robust to temporal variations in the environment, such as variations in traffic and/or in human density and movement.

In other words, embodiments of the invention provide accurate positioning and tracking of users within a target coverage area by way of downlink signals transmitted by one (or more) access points (or base stations) and reflected by one or more smart surfaces and algorithms performed at the user terminals. Further, one or more embodiments may provide accurate positioning and tracking of users within a target coverage area by way of uplink signals transmitted by one (or more) access points (or base stations) and reflected by one or more smart surfaces and algorithms performed at one or more access points.

In one or more embodiments, methods described herein relate to the use of smart surfaces to provide fast accurate and robust localization in environments high traffic indoor environment such as malls, and in urban outdoor environments with high-rise buildings. The method may, for example, fall within the class of fingerprinting methods for localization. Unlike traditional methods for which the fingerprints based on which user locations are distinguished are dictated by the existing scattering environment and are thus, are at the mercy of nature, the method(s) contained herein leverages specific base-station signaling and special operation of the RIS panels in order to create fingerprints that can allow to distinguishing user location more accurately and reliably, resulting in fast and accurate and robust localization.

By placing, for instance, meta-surface panels high up on high-rise buildings and tilting the reflections downwards towards the coverage area, a stable wireless link is created between the BS and any user in the coverage area. In particular, the link between the meta-surface and any UE is LOS and does not suffer from any blockage (e.g., human or otherwise). Similarly, the link between the meta-surface and the BS is also LOS. The combination of the two links is thus stable and only depends on the reflection patterns induced by the totality of the smart tiles that comprise the meta-surface. As discussed further below, embodiments of the invention can leverage any FR1 or FR2 cellular band, or any Wi-Fi band. In addition, embodiments of the invention can be combined with GPS to provide a positioning method with much broader coverage. Also, as the links are all line-of-sight (yielding deterministic features for fingerprinting), the database may be geometry-specific. This means that in different coverage areas where the same geometry can be reused the fingerprint database is identical. In addition, no field measurements are needed since the database can be analytically generated leveraging the physics of radio signal propagation and the RIS reflections.

As discussed in further detail below, using multiple panels that are placed sufficiently far from each other enables fast and accurate user positioning even with lower bandwidths. In the case that positioning is accomplished via UL signaling, i.e., based on received reflections at the base station, the base station can filter the received surface reflections through directional beams in order to separate the reflections arising from different panels, thereby getting a richer set of features for fingerprinting. In the case that positioning is accomplished via DL signaling, i.e., based on received reflections at the user terminal, this can be enabled by having the base station transmit distinct pilots on directional beams towards the different panels and having these pilots artificially delayed with respect to one another, so as to increase the delay spread of the received reflections at the UE.

One or more embodiments of the present invention enable improved localization over current solutions in the art. For example, one or more embodiments of the present invention improve localization for: outdoors high-traffic urban environments with high-rise buildings and indoors in high-traffic environments such as shopping malls and stadiums.

For context, embodiments of the claimed invention leverage the use of smart surfaces for modifying the propagation environment and also may rely on fingerprinting to estimate the user location. The method(s) disclosed herein rely on a "disco-ball" type of rotation of the reflecting patterns induced by the smart surface. The surface is virtually partitioned into tiles, each of which directs its reflection to a different part of the coverage area.

As shown in the examples associated with the invention, fast and accurate positioning can be achieved by properly adjusting the size of the virtual tiles, the associated reflection patterns, and the beacons transmitted by the access point.

One or more advantages may include that the method can provide fast and accurate positioning and tracking in environments where other popular methods cannot such as outdoors in "Street Canyon" environments, indoor shopping malls, or indoor arenas, or any other such environment featuring high-volume or changing environments. That is, the performance is not affected by changes in the environment unless such changes obstruct the paths from the surface to the access point or from the surface to the user. Hence, the resulting positioning is robust with respect to changes in the environment. Additionally, unlike conventional fingerprinting, the method described by embodiments of the invention is not labor intensive.

Although one or more embodiments may require building a fingerprint database, the database depends only on the relative geometry between the surface, the base-station, and the coverage area. In that sense, the same geometry and thus same database can advantageously be reused over and over. Moreover, as the fingerprints can be analytically predicted a priori (i.e., based on the physics of Line-Of-Sight (LOS) propagation and of reflections at the surface), there is no need for labor-intensive field measurement campaigns to obtain the fingerprints.

Potential disadvantages may include that the method(s) is not a "use-everywhere" positioning scheme because it may require the presence of smart surfaces to change the propagation environment. Further, it can be leveraged selectively in places where higher precision positioning is needed for enabling location-based services.

Smart scattering environments are henceforth discussed in accordance with one or more embodiments. With respect to coverage over Frequency Range 1 (FR1) bands there may be a good cell coverage footprint. For example, the majority of cell coverage is Non-LOS such that signals can penetrate buildings and may also be received via multiple reflections. Further, stable cell coverage may be ensured even when there may be blockage by people, buildings, or foliage.

With respect to FR2 (i.e., mmWave and beyond), there may be limited or fragmented cell coverage. In particular, higher frequencies may potentially be limited to LOS or limited range, do not penetrate buildings well, and afford limited reflections. In other words, intermittent coverage may occur from blockage by people, foliage, or buildings.

One potential option for improving FR2 coverage is to have higher cell densities although this may or may not have impacts on capital expenditures or operational expenditures. As a possible alternative, "Smart Radio Environments" are considered that may alter the scattering environment in a smart way. Passive reflect-array (RA) structures represent one such class of devices that do not require power and can be leveraged to improve indoor coverage. Active repeaters represent another class of smart devices which are powered and can thus be leveraged to improve coverage outdoors. Another class involves Reconfigurable Intelligent Surfaces (RIS), which may improve coverage both indoors and outdoors. Embodiments of the invention pertain to the use of such devices.

Figure 4:
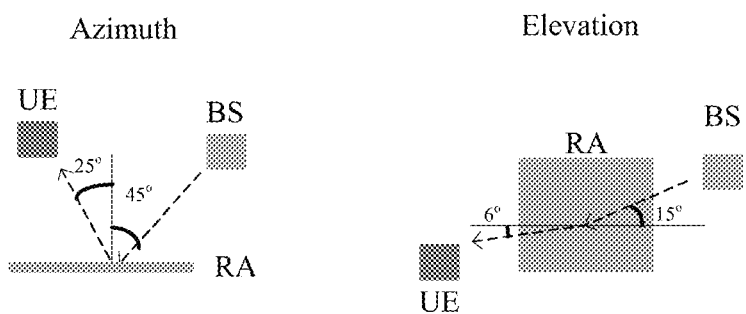
FIG. 4 shows an illustration of the impact of passive reflect-arrays on the propagation environment.
Figure 5:
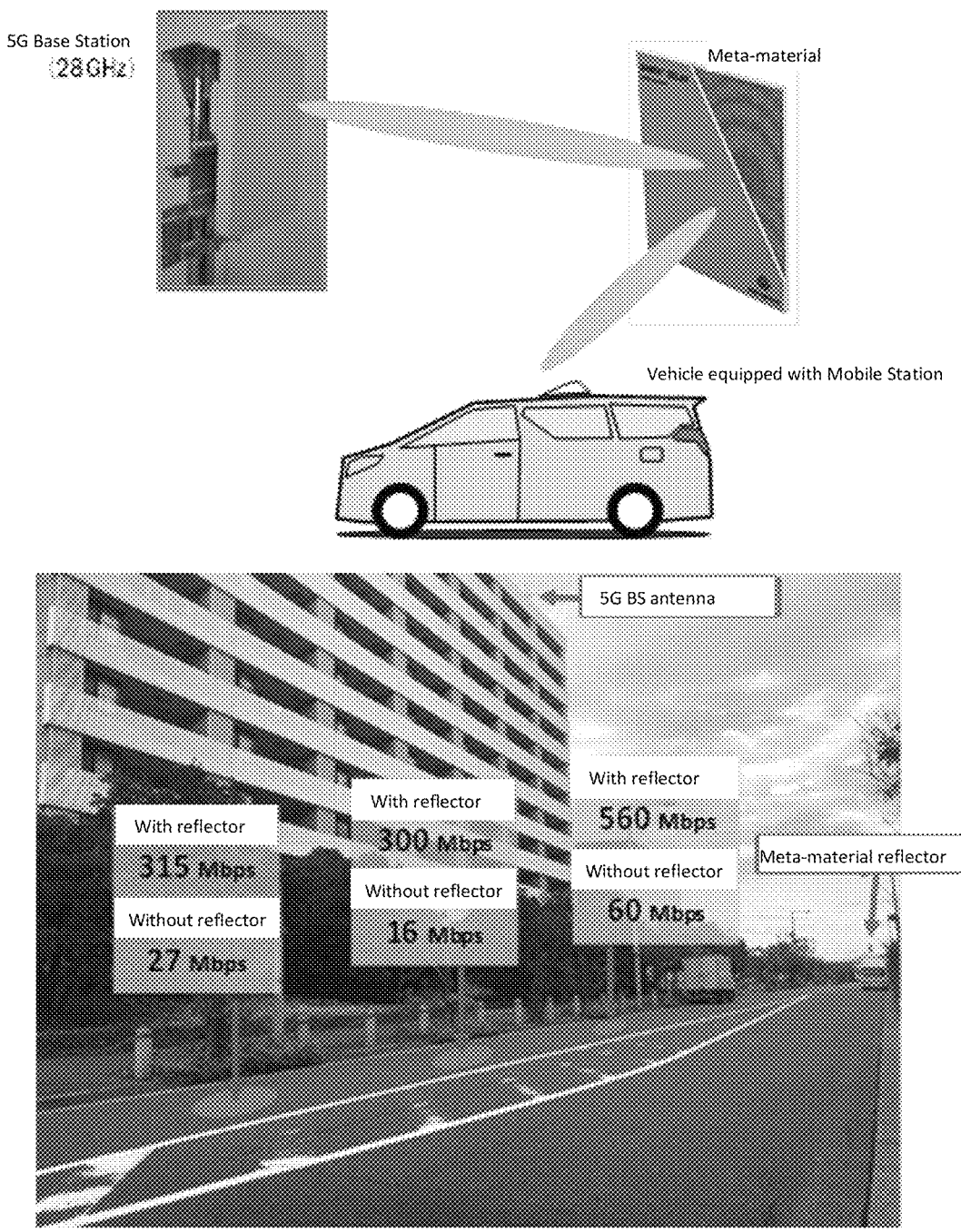
FIG. 5 shows an example of outdoor use of passive reflect-arrays.

Passive RAs are discussed with reference to FIG. 4 and FIG. 5. They can be viewed as "smart mirror" reflectors designed primarily for indoor environments. These "smart mirror" reflectors are panels made of sub-wavelength patterns. The panels are designed to "bend" and direct electromagnetic (EM) signals in areas with low or no coverage. These panels may offer improved coverage as well as a richer scattering environment for MIMO.

Figure 6:
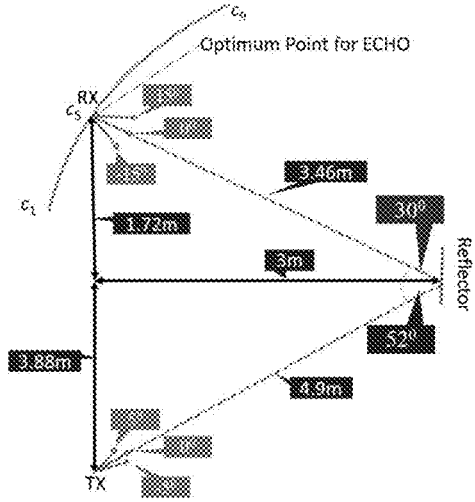
FIG. 6 shows an example of indoor experiments with passive reflect-arrays.
Figure 6:
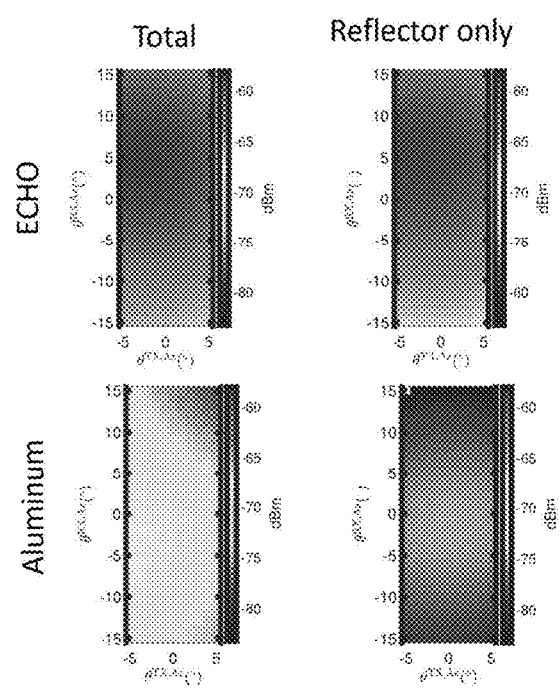

With reference to FIG. 6, an RA indoor experiment is described. In particular, a Reflect-array made by MetaWave Inc. referred to as ECHO, is compared against an aluminum reflector. The RSS comparison made at point for which ECHO was designed is shown in FIG. 6 and clearly illustrates the efficacy of such RA designs.

Figure 7:
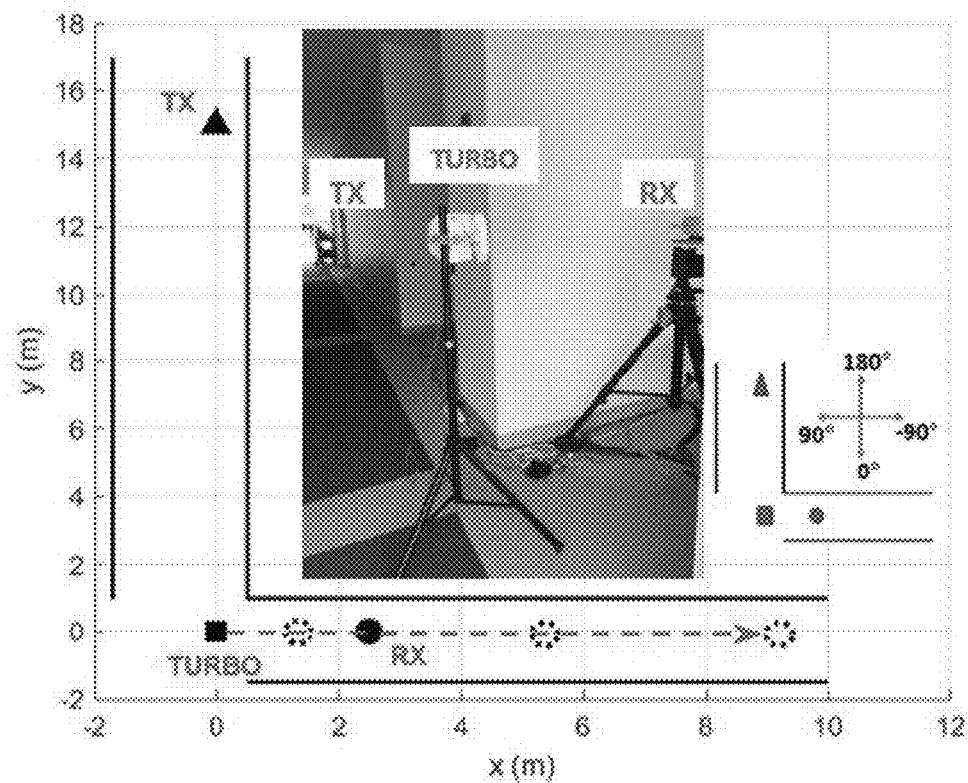
FIG. 7 shows an example of active repeaters.
Figure 7:
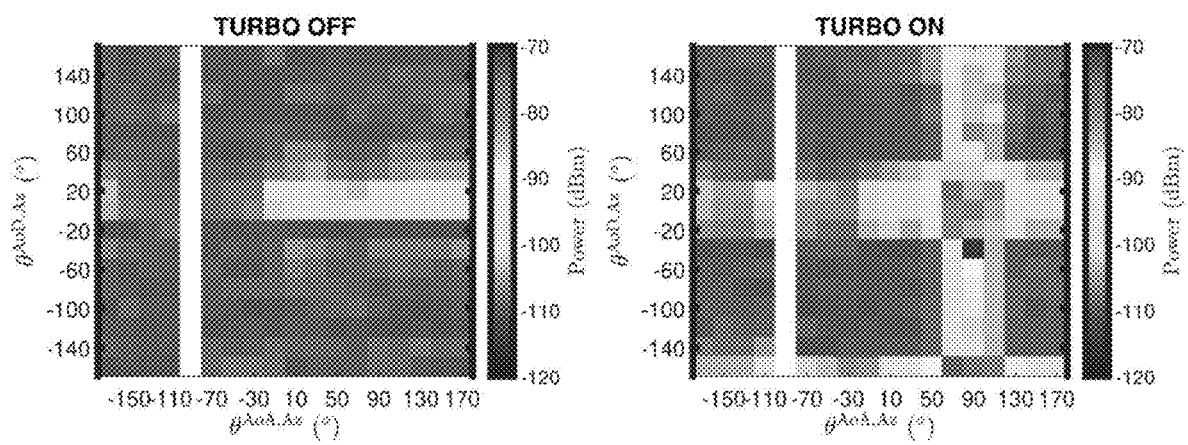

Active repeaters will now be discussed with reference to FIG. 7. Active repeaters may be designed for outdoors or outdoor to indoor communication. Active repeaters may fill coverage gaps and boost and redirect received signals in areas with low or no coverage. In deployments involving active repeaters, repeater signals may appear at the receiver as additional multi-path (i.e., additional to what is produced by the scattering environment). This is because active repeater processing is analog-only processing and it thus incurs delays of only a few ns (amounting to multipath terms that are longer by only a few meters), which is well within the OFDM CP.

One or more embodiments of the invention relate to smart surfaces. Also referred to as reconfigurable intelligent surfaces (RIS), such surfaces reflect EM signals flexibly in arbitrary directions. As such, the Network can actively control how electromagnetic signals are bent and redirected. In other words, embodiments of the invention provide an opportunity for the network to fully control the propagation environment. Such control can be AI enabled and can yield network performance improvements and enable new services.

Power may be required in order to actively control the reflection properties of a RIS panel. However, reflections need not be amplified. There are many different RIS hardware designs available in the literature spanning a broad gamut of spectrum. RIS hardware designs may be classified as discrete or continuous.

Figure 8:
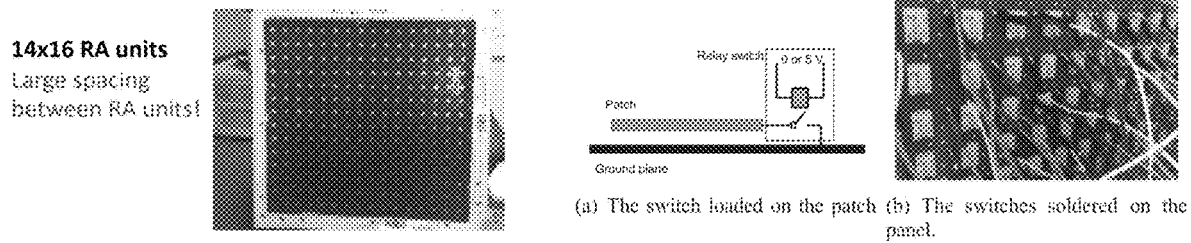
FIG. 8 shows an example of discrete hardware designs from the literature.
Figure 9:
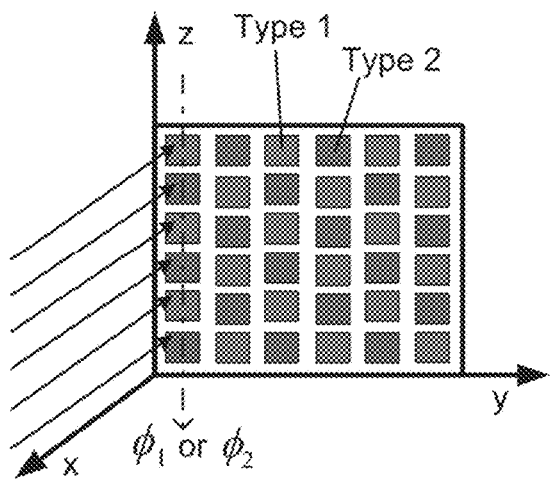
FIG. 9 shows an illustration of the principles exploited by the discrete hardware design shown in FIG. 8.

FIG. 8 and FIG. 9 illustrate aspects of a particular discrete hardware design. As shown in the RIS design in FIG. 8 and FIG. 9, discrete designs comprise individual reflecting elements (patches in the given example) that are individually controlled and are typically spaced one or more wavelengths apart. In the example, the RIS is designed to operate at 60 GHz ($\lambda=5$ mm). Reflection angles are materialized by turning RA patches on/off. Different reflection angles are achieved via different on/off patterns across the board.

Figure 10:
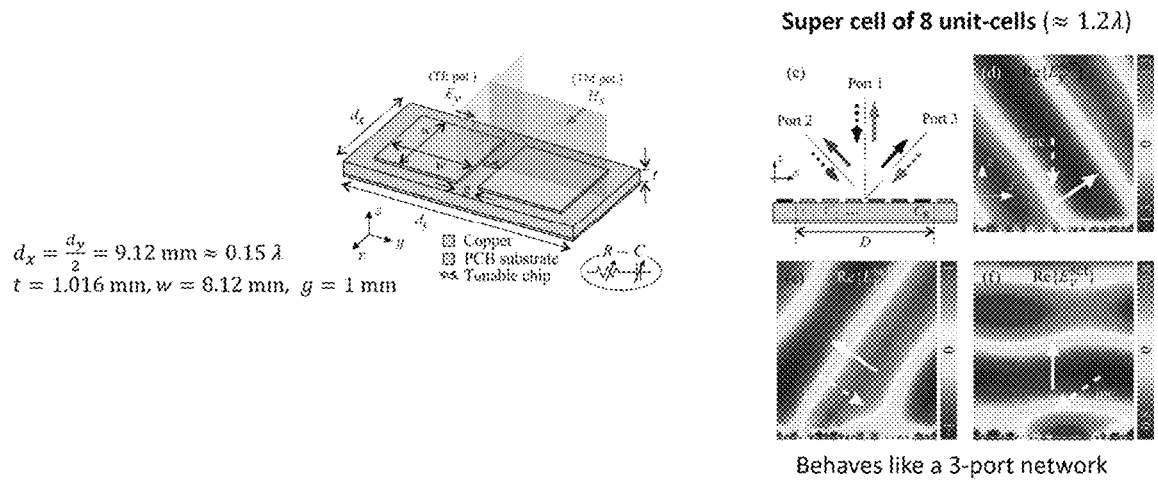
FIG. 10 shows an example of continuous hardware designs from the literature.

An example of a continuous hardware design is shown in FIG. 10. The smart surface shown in FIG. 10 is made of sub-wavelength element patterns, which allow surface plane waves to travel through RIS. This continuous RIS was designed to operate at 5 GHz ($\lambda=60$ mm). The design leverages a tunable integrated circuit (IC) chip, which allows locally modifying the surface impedance of the meta-surface in a continuous way. This surface impedance plays the role of the "transfer function" when it comes to reflections and its modification can be computer controlled. Such continuous RIS designs offer superior flexibility and reflection efficiency with respect to their discrete counterparts.

Figure 11:
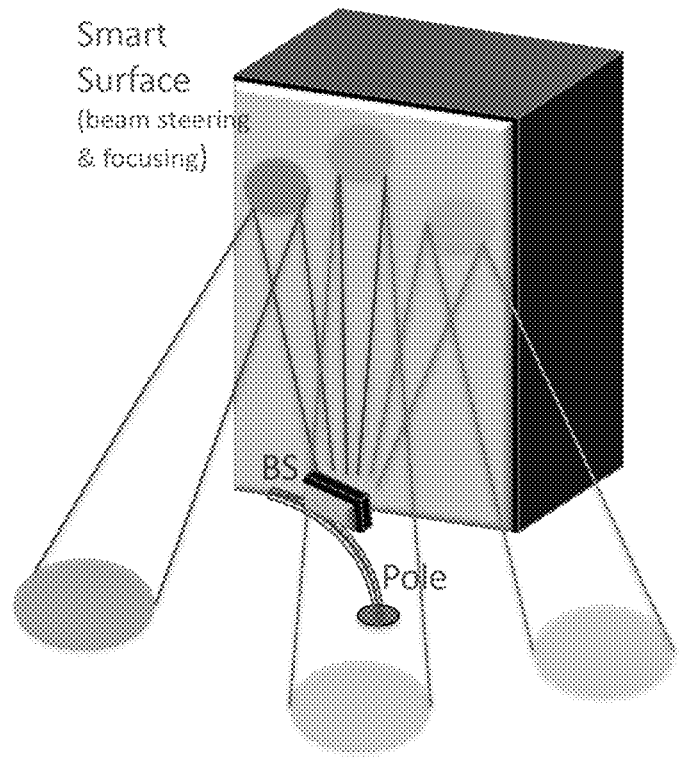
FIG. 11 shows an option for smart-surface deployment and use for "Street Canyon" environments.

With reference to FIG. 11, smart surface concepts associated with embodiments of this invention for "Street Canyon" environments are discussed. One or more embodiments of the invention place smart surface panels high up on tall buildings. From the point of view of receivers on the ground, reflections from panels high-up on such buildings directed downwards appear similar to transmissions coming from tall towers with substantial tilting downwards. As such they have a number of desirable properties, which include:

Both links (BS→smart surface; smart surface→UE) are line of sight (LOS) links;

No obstructions or very low probability of obstruction of the two aforementioned LOS links;

Very stable propagation channels between UEs & BS;

Such stable high-signal strength unobstructed propagation allows ultra-reliable low-latency high-data-rate communication and fast and accurate positioning and tracking.

Further, one or more advantages include the following. High energy concentration and directivity make intercell interference negligible. As mentioned above, it is as if having tall towers with a significant tilting. Almost no Channel State Information (CSI) is required. Far better coverage can be provided in street canyon environments. In addition macro-diversity can be provided against blockage especially by using large RIS panels or multiple RIS panels. Such an arrangement can also be combined with, e.g., repeaters to serve O2I (not shown in the figure). As embodiments of this invention demonstrate, with the proper operation, such deployments can yield fast and accurate positioning and tracking in these environments. In one such embodiment, the BS can be fed with mmWave front haul.

Figure 12:
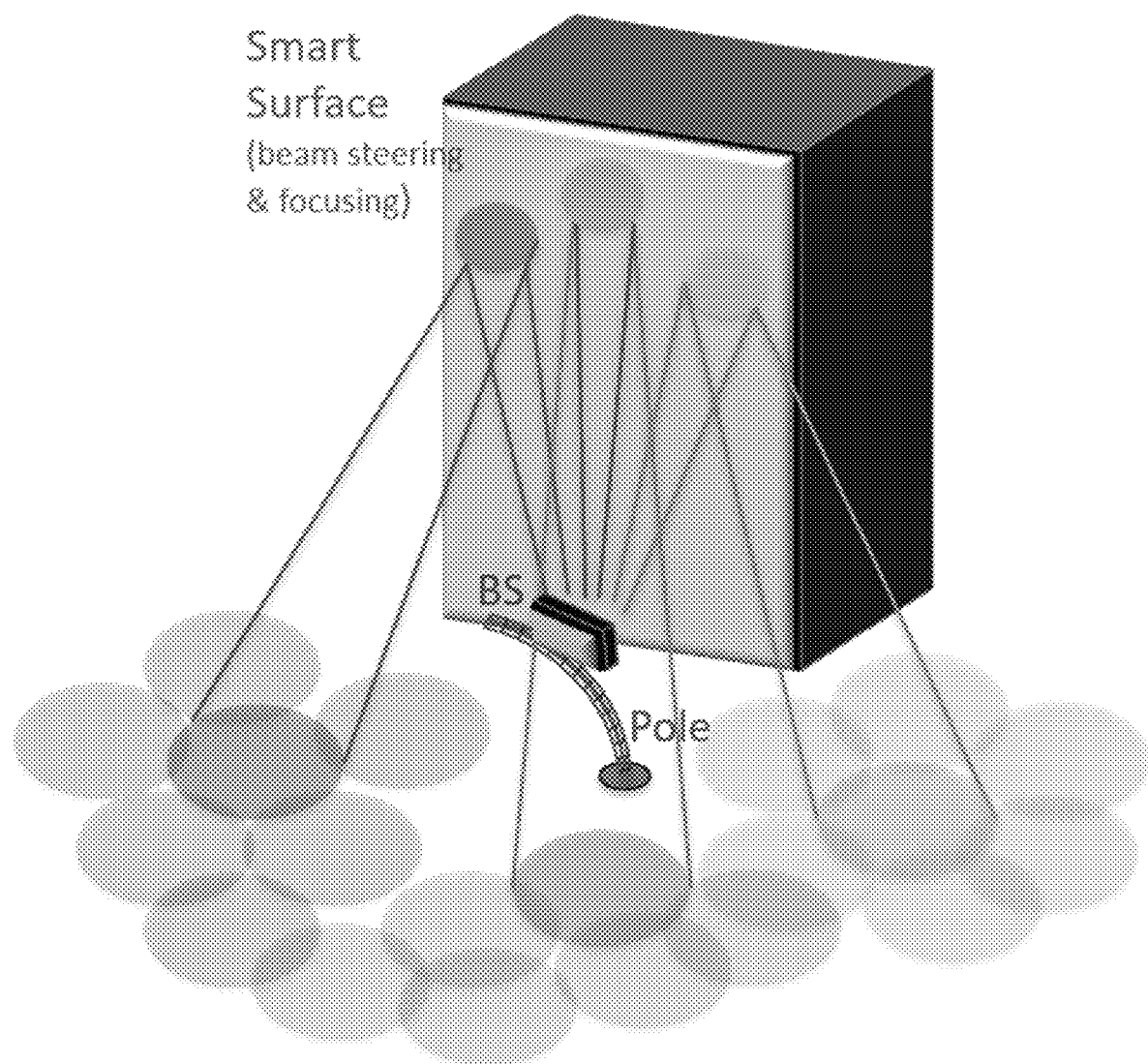
FIG. 12 shows an option for smart-surface deployment and use for "Street Canyon" environments.

FIG. 12 illustrates some additional advantages of such smart surface concepts for "Street Canyon" environments. In one or more embodiments in accordance with FIG. 12, improved coverage and rates may be realized by one or more of the following.

Each RIS tile has some steering flexibility. That is, it can focus, or redirect, its reflected power on a fraction of its "coverage area." RIS tiles are superior in this way to "fixed" passive reflect-arrays, especially outdoors. Fixed reflectors spread their reflections across their coverage area, regardless of served UE position. Additional RIS advantages with respect to fixed reflectors include:

Higher desired received signal power;

Much lower interference; and

Advantages for positioning and tracking that are leveraged in this invention.

These RIS advantages serve well in outdoor applications. Further, one or more embodiments may be enabled by training and scheduling.

According to the surface reflection modes considered in the literature, an RIS tile can "focus" its reflections in at least two different ways. In one embodiment a tile can redirect a reflection in the direction of a particular coverage position. This is referred to as anomalous reflection in the literature and makes the surface tile act as an "anomalous" mirror. Alternatively, a tile can directly focus its reflection to a specific spot, much like a focusing lens. This is referred to as focusing. In the context of one or more embodiments of the invention, focus can be interpreted to be applied with respect to either one of these two modes of operation. In examples included in this invention, the created RIS-tile reflections are anomalous reflections.

Figure 13:
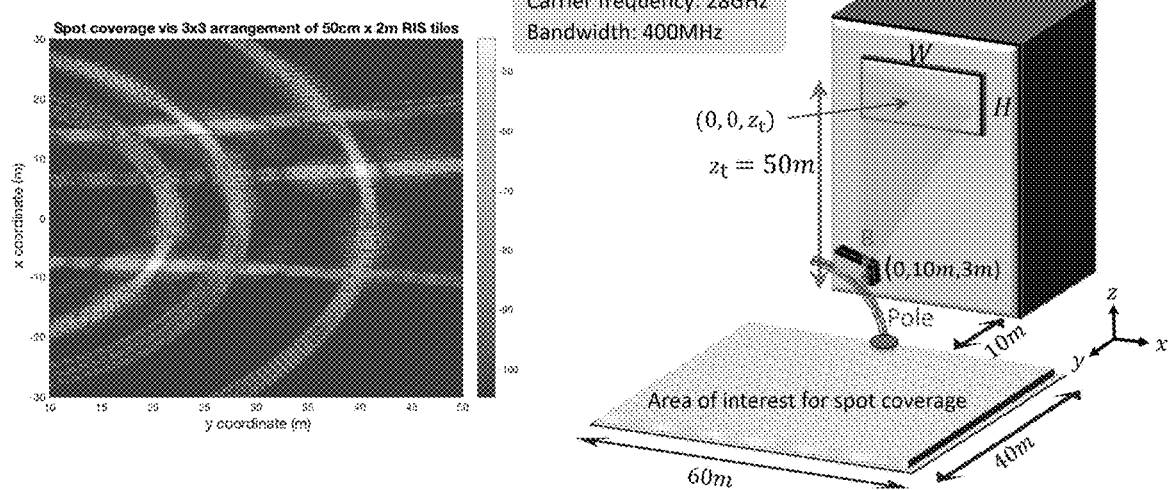
FIG. 13 shows an example of RIS spot coverage for street canyon environments.

FIG. 13 provides an example of "spot-type" coverage achieved by the proposed smart-surface deployment for street canyon environments. In particular, FIG. 13 shows an example of multi-spot coverage (e.g., illustrated by means of received-signal power heatmap). This heat map was obtained using recently established physics-based reflection modeling together with embodiments of the invention that break the surface into smaller groups of tiles that focus their reflection points in unison in order to create the bright spots in the heatmap. In this example, focus means that each tile reflects the impinging waves (transmitted from the base station) in the direction of the focal area.

Figure 14:
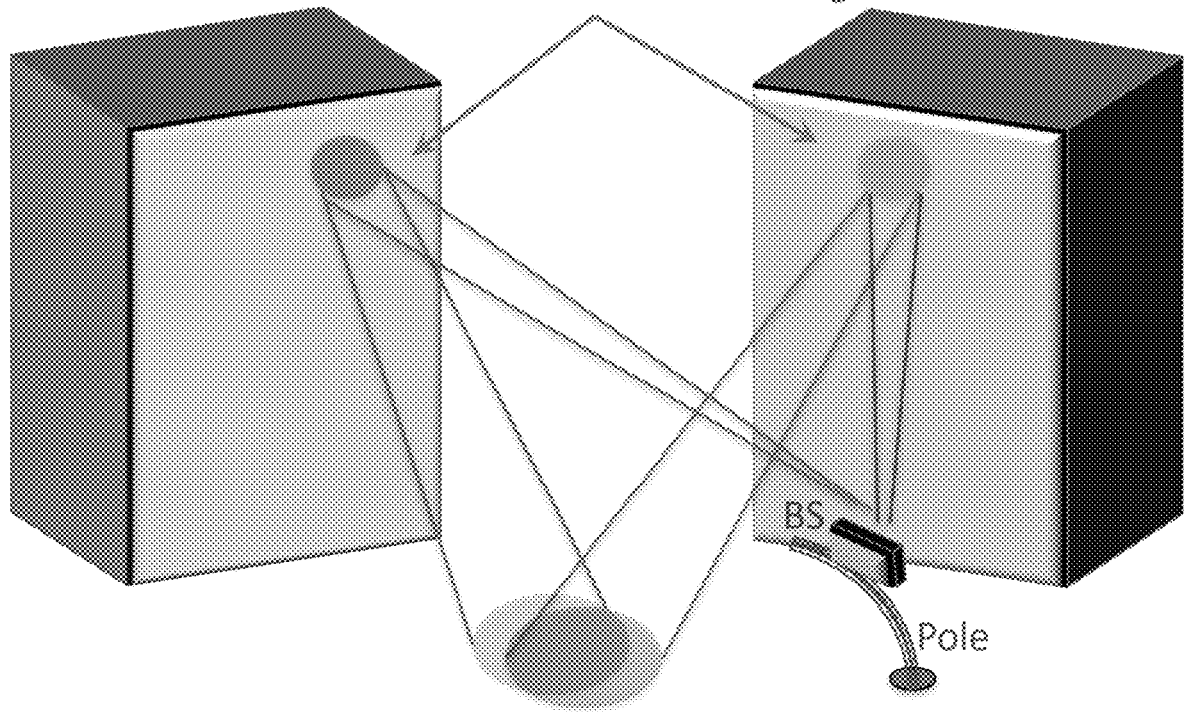
FIG. 14 shows a sample illustration of how an option for smart-surface deployment and use allows combatting blockage.

Turning to FIG. 14, one or more embodiments are discussed for smart surface concepts in the context of combatting blockage. FIG. 14 shows smart tiles employed on different buildings. In one or more embodiments, a UE receives a signal from many different directions (e.g., via reflections from different tiles). Each reflection comes from high elevation, which may also serve to combat blockage.

Figure 15:
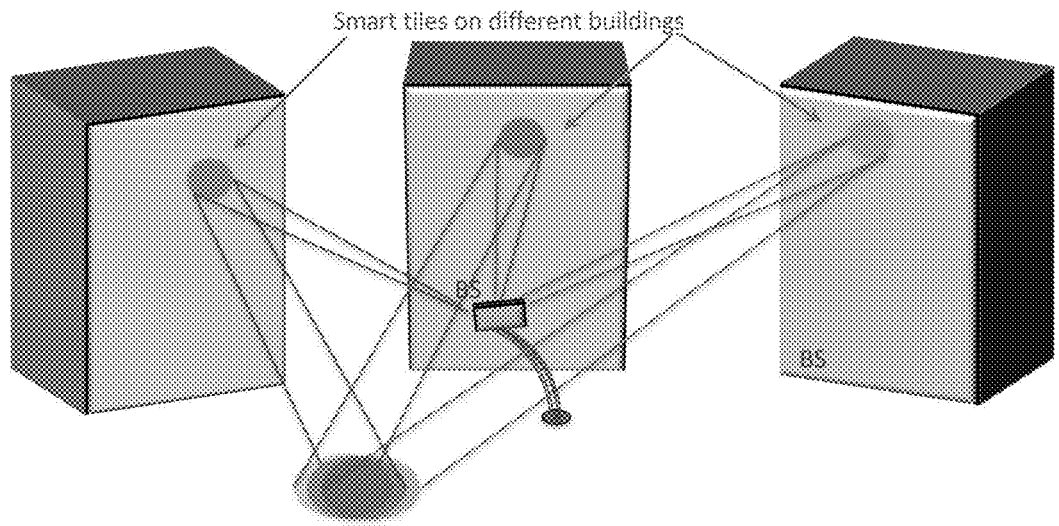
FIG. 15 shows a sample illustration of how an option for smart-surface deployment and use can be leveraged for precise localization with UL signaling, DL signaling, or a combination thereof

Turning to FIG. 15, one or more embodiments are discussed for smart surface concepts in the context of precise positioning using UL signaling, DL signaling, or a combination thereof. As shown in FIG. 15, network assisted positioning may include positioning at a UE via DL transmission (TX). The tiles play a role similar to the one geostationary satellites play for GPS. Unlike GPS, however, embodiments of the invention allow a BS to learn the UE position by means of UL transmissions by the UE. A UL/DL TX combination may also serve to improve positioning accuracy.

Turning to a brief comparison between the proposed embodiments based on smart surfaces and GPS based positioning, GPS employs a Time of Arrival (ToA) based positioning and tracking method, whereas the smart-surface based embodiments in are Power Delay Profile (PDP) based and may also exploit Angle of Attack (AoA). Another important difference has to do with the type of transmitted signals used for positioning. GPS employs satellite omni-broadcast signals, whereas smart surfaces employ directional reflections. This has important implications for tracking. While with GPS the same satellite omni-broadcast signals are used for both positioning and tracking, in the smart-surface based embodiments associated with the invention, reflections can be directed specifically around the UEs being tracked, so as to enable for instance faster tracking of one or more of these UEs.

Figure 16:
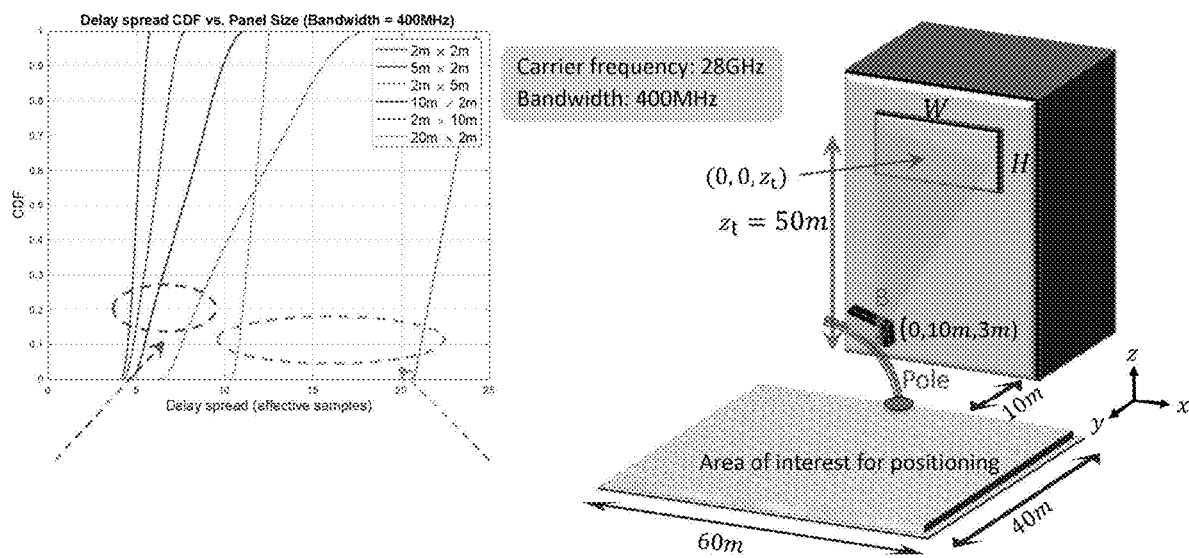
FIG. 16 shows an example of delay spreads with surface panels located at height of 50 m.

FIG. 16 shows an example of UE delay spreads for UEs located on a grid across a 40 m×60 m area based on reflections from surface panels located at height $z_r$=50 m. In one or more embodiments, larger panels may lead to larger delay spreads. With the given geometry, where the BS is 3 m off the ground and the surface panel is 50 m off the ground, "fat" reflection panels result in reflections that yield shorter delay spreads at the UEs than when "tall" panels are used. Regardless, operation of embodiments of this invention ensure that accurate PDP based positioning is possible with all such delay spreads.

Figure 17:
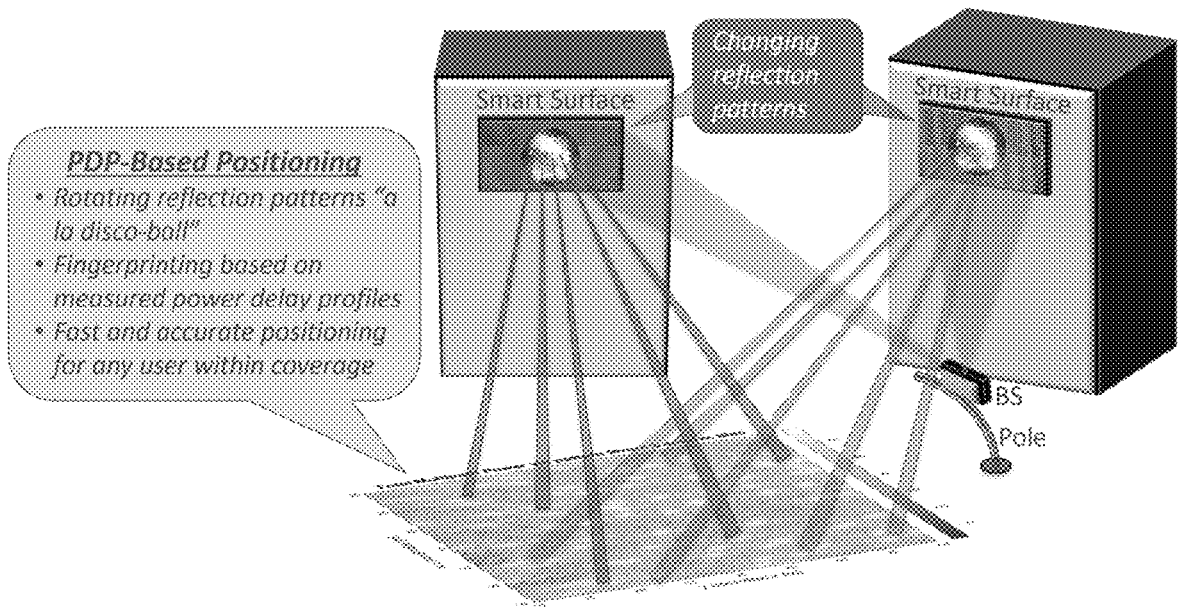
FIG. 17 shows a high-level illustration of user positioning based on a preferred option for smart-surface deployment and operation.

FIG. 17 provides a high-level illustration of user positioning based on a preferred option for smart-surface deployment and operation in accordance with one or more embodiments of the invention. The invention exploits "disco-ball" type reflection patterns from the smart surface. In one or more embodiments, these patterns are periodically or quasi-periodically repeated.

Figure 18:
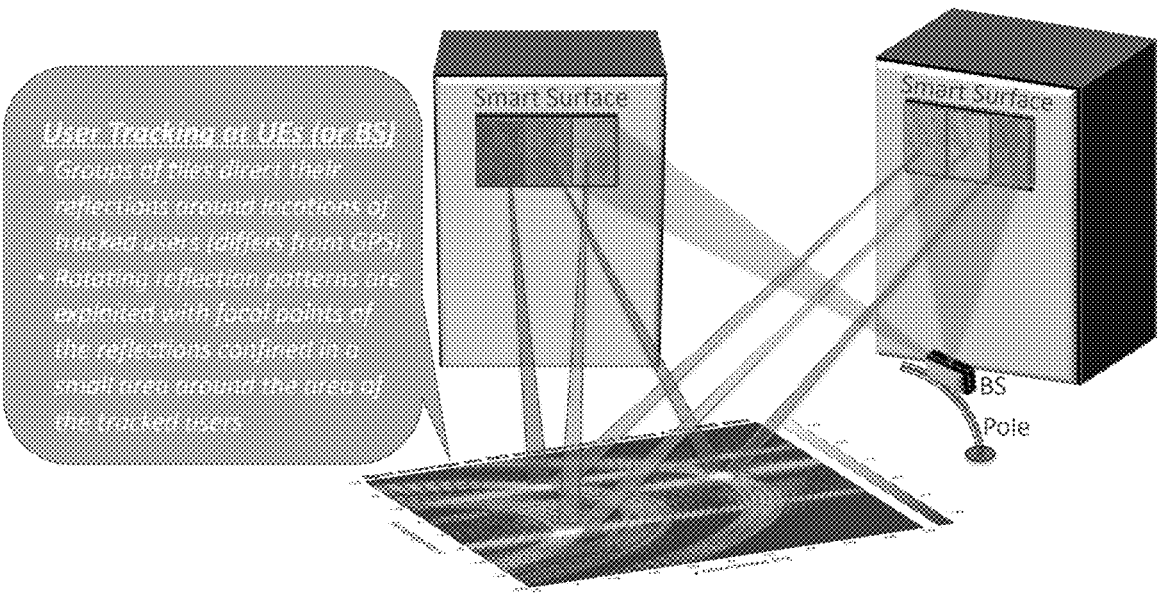
FIG. 18 shows a high-level illustration of tracking specific users based on a preferred option for smart-surface deployment and operation.

FIG. 18 provides a high-level illustration of tracking specific users based on a preferred option for smart-surface deployment and operation in accordance with one or more embodiments of the invention. Embodiments of the invention exploit "disco-ball" type reflection patterns from the smart surface, but these are much finer and concentrate around the area of the users getting tracked.

Figure 19:
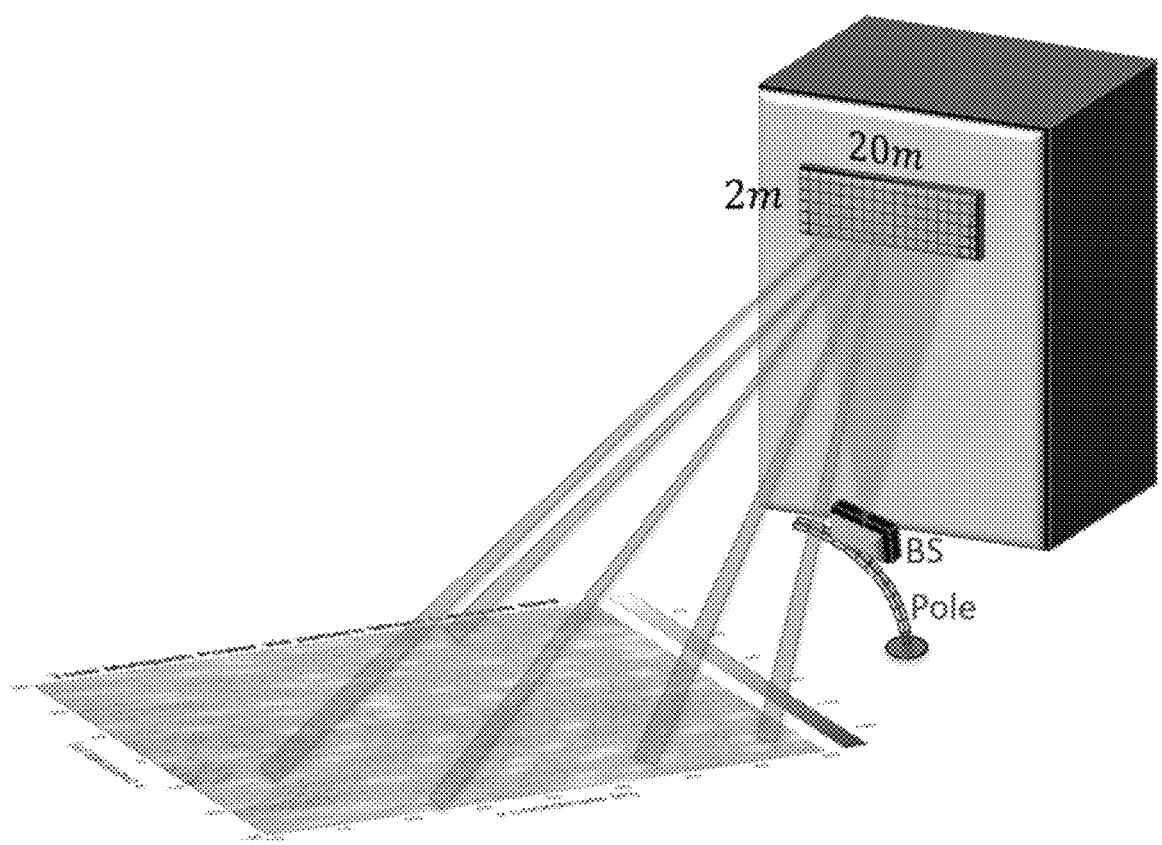
FIG. 19 shows an example of snapshot of a disco-ball type reflection pattern.

FIG. 19 shows a snapshot of such a disco-ball type reflection pattern in the form of the heatmap in the coverage area, and created via reflections from a 20 m×2 m smart surface of an OFDM signal transmitted by a base-station at 28 GHz with 400 MHz bandwidth. To create the heatmap, the RIS was virtually partitioned into smaller smart "tiles." In the embodiment depicted in the FIG. 19, the RIS controller has stirred the reflections from contiguous areas of the smart surface (i.e., each tile) to focus on a particular spot of coverage. Note that the size of the tile makes impacts the size of the coverage spot made by the tile. Also, the positioning beacon transmitted by the base-station may use only a fraction of the 400 MHz bandwidth. Furthermore, the reflection patterns may be rotated over time, for example, at the OFDM symbol rate or slower. In the example, each reflection pattern may be pseudorandom (but known). Further, each smart tile focuses (or redirects) its reflection on a specific randomly chosen location. In the process of optimizing the operation, positioning accuracy can be considered as a function of bandwidth allocated for positioning, smart-tile size, and smart tile number.

One or more embodiments in accordance with the invention are now described. Turning to signaling with the BS sounding pilot signals, the sounding signal may be a pilot (e.g., waveform) that is transmitted on an (antenna) beam whose radiated power is in the direction of smart surface.

The pilot waveform may be time—and bandwidth-limited according to the radio-access technology's format; for example, in the case of OFDM, the pilot waveform can comprise a sounding signal transmitted over a subset of time-frequency elements (e.g., spanning part of the bandwidth of the frequency band allocated for OFDM transmission). Further, it can also correspond to periodic quasi-periodic or aperiodic transmission (e.g., UE tracking triggered by the base-station).

In one or more embodiments, the received propagation channel at each UE in the coverage area comprises reflections from the smart surface but also other propagation paths including possibly a much stronger line-of-sight path. These other paths may have much shorter delays and this allows each UE to remove them prior to performing localization.

In one or more embodiments the RIS panel(s) are turned off periodically to allow each UE to estimate its PDP in the absence of a RIS panel. This allow each UE to remove paths that do not come from the RIS panels prior to performing localization.

In one or more embodiments, the pilot beam is also directed away from the coverage area and only upwards towards the panel. This may guarantee that the received propagation channel at each UE in the coverage area comprises only of reflections from the smart surface.

In one or more embodiments related to smart surface operation, the reflection pattern may be rotated in a periodic or quasi periodic manner over time. In the context of OFDM, one or more embodiments may have the reflection pattern of the smart surface being changed from one OFDM symbol to the next. Alternatively, in one or more embodiments the reflection pattern of the smart surface is changed every few OFDM symbols. Alternatively, in one or more embodiments all reflection patterns are utilized equally over time. In one or more embodiments, the utilization of reflection patterns is non-uniform, which may allow more efficient use of resource, e.g., in the case of user tracking, or in the case of enabling faster positioning in regions of higher traffic.

For example: a 5G NR OFDM symbol at 28 GHz is about 17.84 μs long (e.g., 5G NR numerology corresponding to 60 KHz subcarrier spacing). If a periodic reflection sequence of 30 different patterns is used and if the patterns are rotated at the OFDM symbol rate, then each UE will be able to observe reflections corresponding to all 30 patterns within 535.2 μs, i.e., in a little over half a millisecond.

Figure 20:
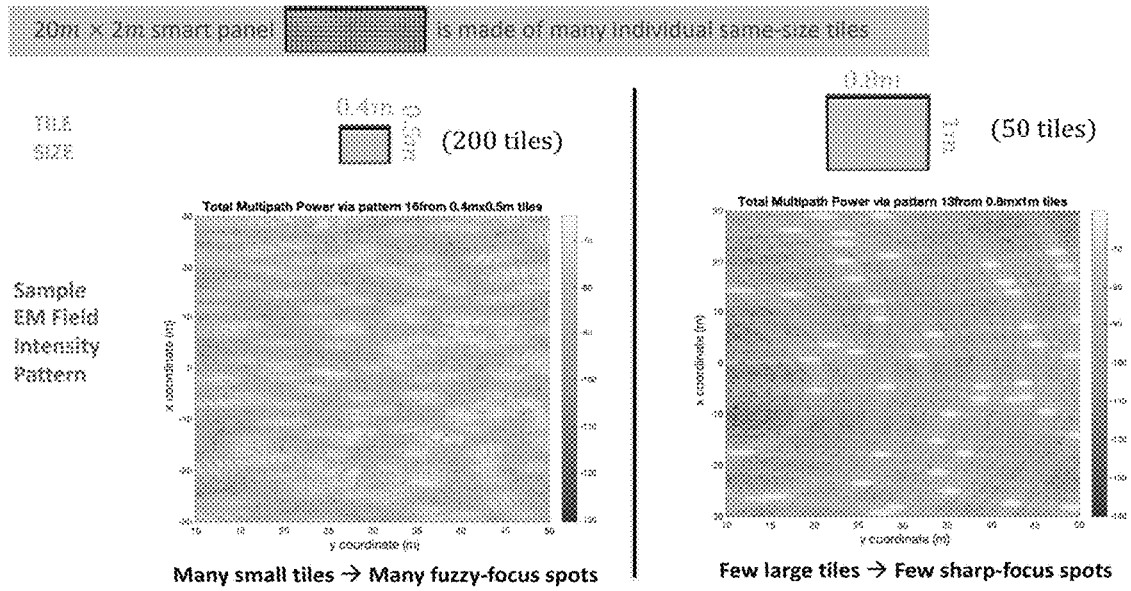
FIG. 20 shows examples of snapshots of reflection patterns vs. smart tile size.

It is noted that although the focal points in each reflection pattern may appear random as shown for example in FIG. 20, they are deterministic and known (i.e., pseudorandom). That is, FIG. 20 shows an example of reflection patterns vs. smart tile size. In fact, care should be taken to ensure that the focal points across all (i.e., periodically varied) patterns are fairly uniformly distributed across coverage so there are no areas that receive unusually low reflection power across the sequence of applied patterns.

Figure 21:
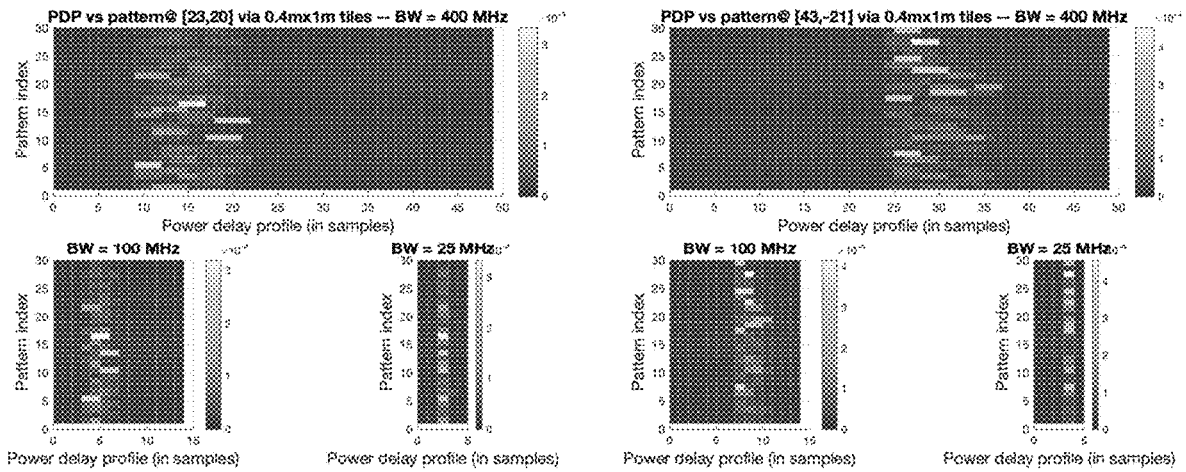
FIG. 21 shows an example of power delay profiles vs. bandwidth.

FIG. 21 shows an example of power delay profiles vs. bandwidth. It is noted that generally smaller bandwidths lead to fewer samples per second, which in turn leads to shorter delay spreads in samples.

With respect to fingerprinting-based positioning method(s), consider that a UE estimates its location via PDP-based fingerprinting. In this scenario, the BS transmits pilots periodically. The smart surface also changes its reflection patterns periodically. The UE estimates the power delay profile for each reflection pattern. The UE then creates its PDP fingerprint and uses it to estimate its location. In a sample embodiment, the position estimation is based on PDP fingerprinting on a grid. Consider as an example the creation of a PDP fingerprint database on a 1 m×1 m grid. The UEs location estimate is the location of the database fingerprint that is the closest to UE fingerprint.

It is noted that the quality of estimate may be limited by grid resolution. Further, one may consider the use of better location estimators (i.e., both in terms of performance but also complexity). For example, state-of-the-art signal-processing or AI-based estimators based on fingerprinting may be considered and those skilled in the art will appreciate that these are not limited to provide location estimates on the grid. These estimators can also use additional features (e.g., angle of arrival) if available to estimate the user location. The simple "detection-type" scheme used in the example allows tradeoffs to be readily illustrated. For example, performance vs tile-size and bandwidth (as well as panel size and location, number of panels, etc.) may be readily studied.

Figure 22:
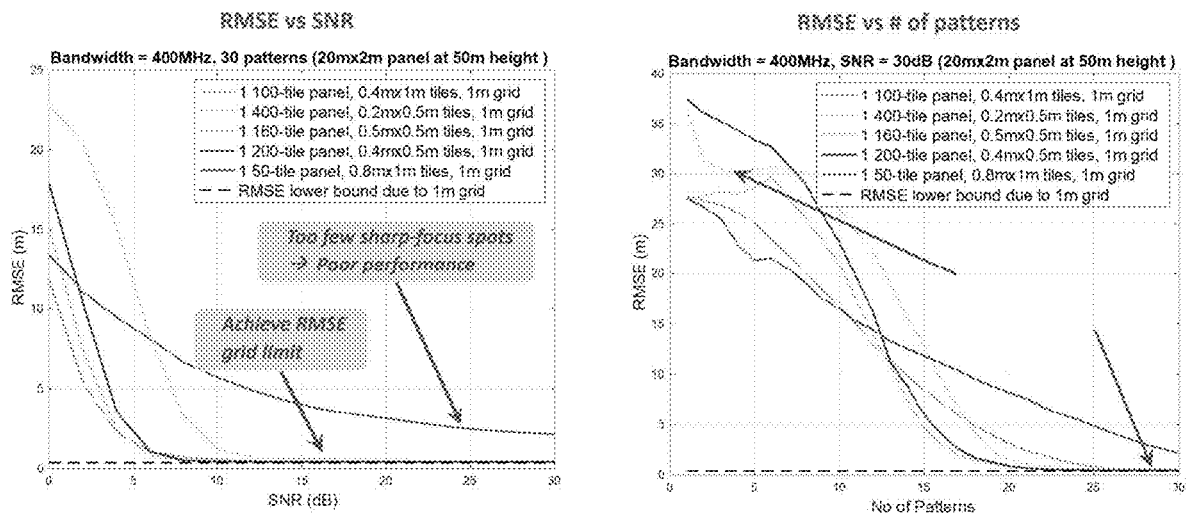
FIG. 22 shows an example of positioning accuracy at 400 MHz bandwidth.

FIG. 22 shows an example of positioning accuracy at 400 MHz bandwidth considering 20 m by 2 m panels, each made of different numbers and sizes of tiles. As shown in the example, not all panels yield the same positioning accuracy. Also not all near-optimal panel configurations may perform equally well. For example, there may be some that yield convergence with fewer disco-ball patterns and/or at lower SNR.

Figure 23:
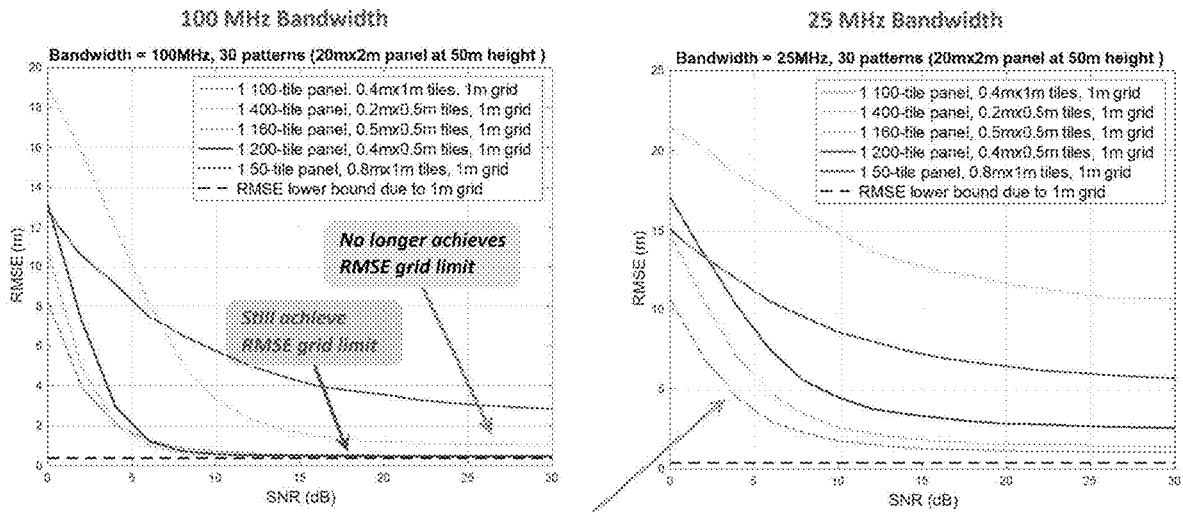
FIG. 23 shows an example of positioning accuracy at lower bandwidths.

FIG. 23 shows an example of positioning accuracy at lower bandwidths. In the example, not all near-optimal tiles (e.g., at 400 MHz) may perform equally well at lower bandwidths. For example, a potentially beneficial arrangement of a panel may be based on 100 tiles that are 40 cm by 1 m each.

Figure 24:
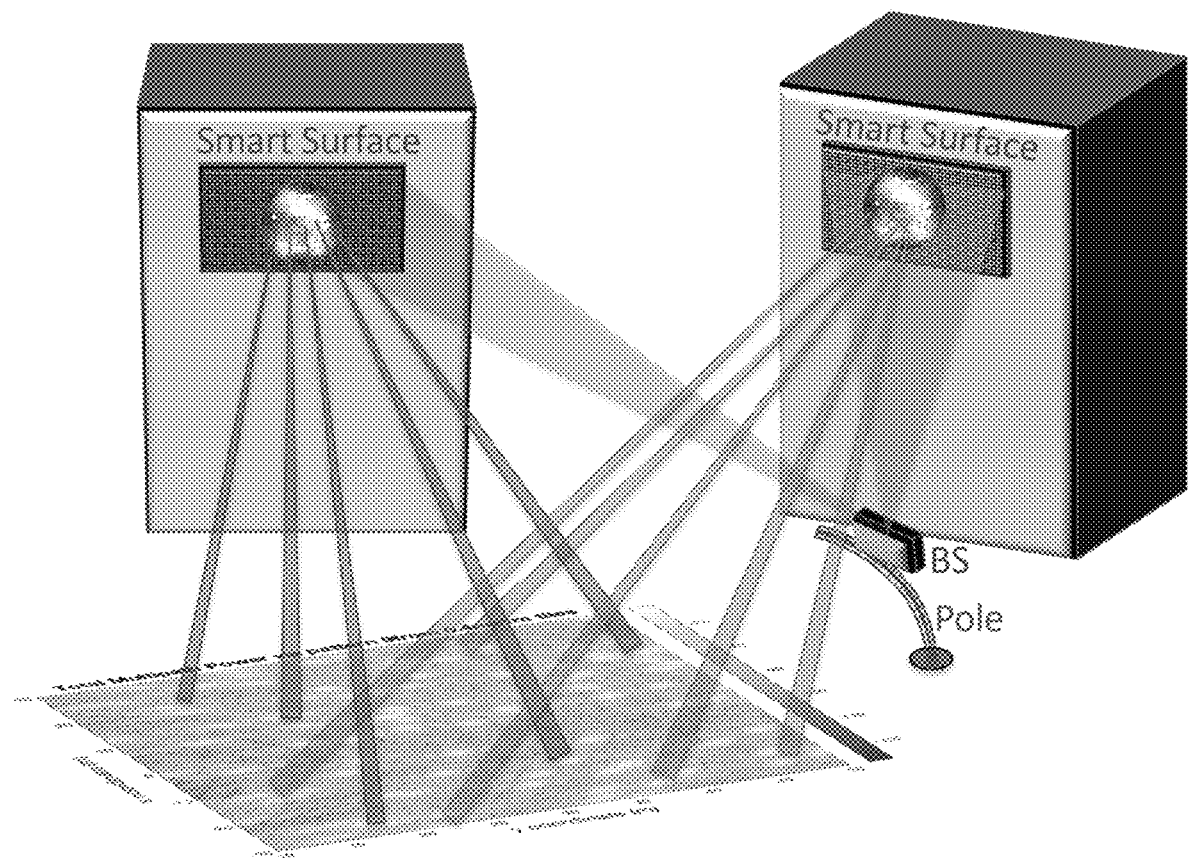
FIG. 24 shows an example of splitting the smart surface area over two buildings.

FIG. 24 shows an example of splitting the smart surface area over two buildings. Those skilled in the art will appreciate that while two buildings are used in the example, more or fewer may also be used. In this example, two half-width panels are used instead of one full-width single panel, resulting in the same total reflection area. Provided that consideration is given to generate the pilot signals according to one or more embodiments of the invention, coverage may be improved as discussed in the following.

One or more embodiments of the invention related to multi-panel operation are henceforth discussed. The BS simultaneously transmits two sounding signals (typically referred to as pilots), i.e., one per panel. Each of the two sounding signals is a pilot waveform that is transmitted on an antenna beam whose radiated power is in the direction of respective panel. Further, the pilot waveform may be time- and bandwidth-limited according to the radio-access technology's format. For example, in the case of OFDM, the pilot waveform can comprise a sounding signal transmitted over a subset of time-frequency elements (e.g., spanning part of the bandwidth of the frequency band allocated for OFDM transmission). It may also correspond to periodic quasi-periodic or aperiodic transmission (e.g., UE tracking triggered by the base-station).

In one or more embodiments, the two pilot waveforms may be artificially delayed with respect to one another. For example, in the context of OFDM in one or more embodiments a different subset of time-frequency elements is allocated for sounding signals for each pilot beam and this operation allows the user terminal to easily separate the received reflections associated with each panel; the operation leverages the use of twice as many transmission resources as for the single panel scheme.

Alternatively, in one or more embodiments the same subset of time-frequency elements is shared by both pilot beams, thereby using the same transmission resources as the single-panel scheme. In this case, two superimposed pilot waveforms transmitted by the two BS (each towards a distinct panel) are transmitted within any given OFDM symbol (comprising all time-frequency elements with the same "time" index). These two waveforms are artificially delayed with respect to each other by a delay difference that is a (small) fraction of the OFDM circular prefix.

The artificially introduced delay should be large enough to allow the received reflections from the two panels at any given UE location in the coverage area to not overlap, in order to enable the UE to easily separate them. Such an application applies well to the coverage areas of interest (e.g., Street Canyon environments, or Shopping malls).

Figure 25:
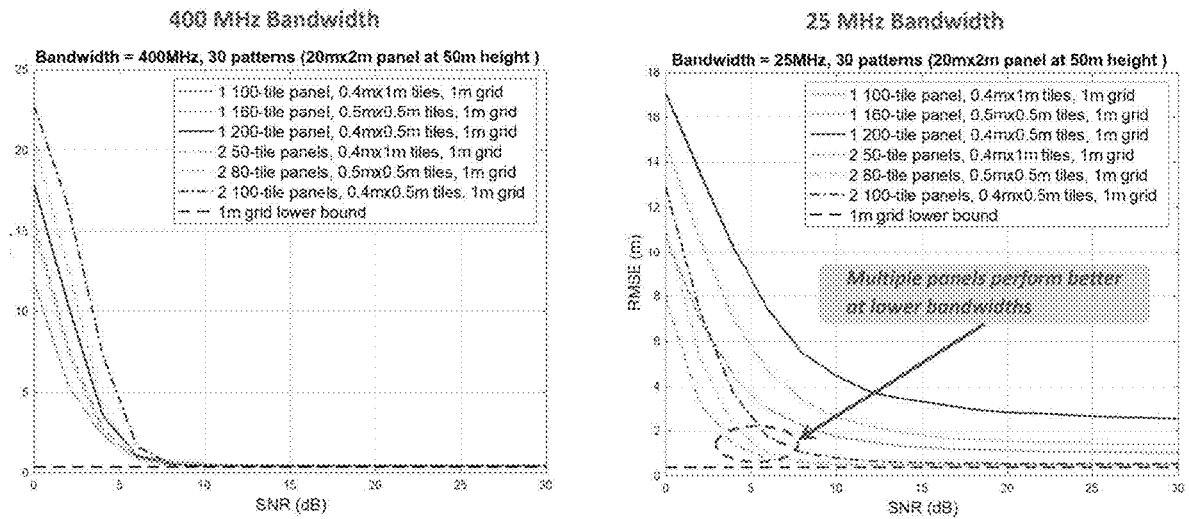
FIG. 25 shows an example that compares the positioning accuracy achieved by a single surface against the positioning accuracy that is achieve when the surface is split over two buildings as shown in FIG. 24.

FIG. 25 shows an example of splitting the surface over two buildings relaxing bandwidth requirements. One or more embodiments in accordance with FIG. 25 may demonstrate the benefit of multiple panels, i.e., with delay artificially introduced between the two pilot beams. In other words, larger delay spreads may lead to better positioning performance at lower bandwidths.

Variation

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/present embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/present embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations may have the functions of the user terminals described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

One or more embodiments illustrated in this specification may be used individually or in combinations, which may be switched depending on the mode of implementation. The order of processes, sequences, flowcharts, and so on that have been used to describe the aspects/present embodiments herein may be re-ordered as long as inconsistencies do not arise. For example, although various methods have been illustrated in this specification with various components of steps in exemplary orders, the specific orders that are illustrated herein are by no means limiting.

One or more embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, assuming, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

Furthermore, the term "or" as used in this specification or in claims is intended to be not an exclusive disjunction.

Now, although the present invention has been described in detail above, it should be obvious to a person skilled in the art that the present invention is by no means limited to the embodiments described in this specification. The present invention can be implemented with various corrections and in various modifications, without departing from the spirit and scope of the invention defined by the recitations of claims. Consequently, the description in this specification is provided only for the purpose of explaining examples, and should by no means be construed to limit the invention according to the present invention in any way.

The above examples and modified examples may be combined with each other, and various features of these examples may be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method for estimating a location of at least one of one or more user terminals over a target coverage area by wireless signals transmitted by one or more access points and reflected by one or more reconfigurable intelligent surface panels, the method comprising:
   transmission of one or more pilot signals by each of the one or more access points;
   reflecting, by at least one of the one or more reconfigurable intelligent surface panels, the one or more pilot signals according to one or more predetermined reflection patterns;
   receiving the reflections by the user terminal;
   extracting one or more features based on radio channel characteristics from the reflections; and
   estimating of the one or more user terminals location by a method based on comparing the extracted one or more features based on the radio channel characteristics to a database comprising pairs of locations and features based on one or more radio channel characteristics,
   wherein the reflection pattern across all tiles is varied over time.

2. The method of claim 1, wherein at least one of the one or more reconfigurable intelligent surface panels are virtually partitioned into contiguous tiles, each tile reflecting an impinging pilot signal in a tile-dependent direction.

3. The method of claim 2, wherein a reflection focal point of each tile is chosen pseudo-randomly over the target coverage area.

4. The method of claim 2, wherein the reflection pattern across all tiles is pseudo-randomly changed over time.

5. The method of claim 2, wherein at least one of a number and a size of the virtually partitioned tiles is changed over time.

6. The method of claim 5, wherein the pilot signals have been artificially delayed with respect to one another at the one or more access points prior to their transmission.

7. The method of claim 2, wherein the reflection pattern across a group of tiles is restricted to a given coverage area, and a focal point of each tile in the group is otherwise chosen pseudo-randomly over that area.

8. The method of claim 1, wherein pilots are transmitted on different beams from a single access point of the one or more access points and directed to different parts of the one or more reconfigurable intelligent surface panels.

9. The method of claim 1, wherein the pilot signals transmitted by non-collocated access points have been delayed with respect to one another prior to their transmission.

10. A method for estimating a location of at least one user terminal over a target coverage area by wireless signals transmitted by one or more user terminals and reflected by one or more reconfigurable intelligent surface panels, the method comprising:
    transmission of one or more pilot signals by the user terminal;
    reflecting, by at least one of the one or more reconfigurable intelligent surface panels, the one or more pilot signals according to one or more predetermined reflection patterns;
    receiving the reflections by at least one of the one or more access points;
    extracting one or more features based on radio channel characteristics from the reflections; and estimating of the one or more access points location by a method based on comparing the extracted one or more features based on the radio channel characteristics to a database comprising pairs of locations and features based on one or more radio channel characteristics, wherein the reflection pattern across all tiles is varied over time.

11. The method of claim 10, wherein at least one of the one or more reconfigurable intelligent surface panel is virtually partitioned into contiguous tiles, each tile reflecting an impinging pilot signal in a tile-dependent direction.

12. The method of claim 11, wherein a reflection focal point of each tile is chosen pseudo-randomly over the target coverage area.

13. The method of claim 11, wherein the reflection pattern across all tiles is pseudo-randomly changed over time.

14. The method of claim 11, wherein the reflection pattern across a group of tiles is restricted to a given coverage area, and a focal point of each tile in the group is otherwise chosen pseudo-randomly over that area.

15. A system for estimating a location of a user terminal over a target coverage area by wireless signals transmitted by an access point and reflected by a reconfigurable surface panel, the system comprising:

an access point to transmit pilot signals;

a reconfigurable surface panel that reflects the transmitted pilot signals flexibly across the coverage area in a pattern varied over time, wherein the reconfigurable surface panel is placed so as to have an unobstructed view to a base station and the coverage area; and a user terminal that receives reflections from the reconfigurable surface panel, extracts one or more features based on radio channel characteristics from the reflections, and estimates a location of the user terminal by a method based on comparing the extracted one or more features based on the radio channel characteristics to a database comprising pairs of locations and features based on one or more radio channel characteristics.

16. The system of claim 15, wherein the reconfigurable surface panel is placed sufficiently high with respect to the coverage area to have unobstructed view regardless of traffic.

* * * * *